US012069989B2

(12) United States Patent
Bonte et al.

(10) Patent No.: US 12,069,989 B2
(45) Date of Patent: Aug. 27, 2024

(54) MOUNTING FOR A BALING MACHINE GEARBOX

(71) Applicant: CNH Industrial America LLC, New Holland, PA (US)

(72) Inventors: Xavier G. J. M. Bonte, PB Zuidzande (NL); Frederik Demon, Bruges (BE)

(73) Assignee: CNH Industrial America LLC, New Holland, PA (US)

( * ) Notice: Subject to any disclaimer, the term of this patent is extended or adjusted under 35 U.S.C. 154(b) by 783 days.

(21) Appl. No.: 17/245,899

(22) Filed: Apr. 30, 2021

(65) Prior Publication Data

US 2021/0243960 A1 Aug. 12, 2021

Related U.S. Application Data

(63) Continuation of application No. PCT/EP2019/079697, filed on Oct. 30, 2019.

(30) Foreign Application Priority Data

Nov. 2, 2018 (EP) ..................................... 18204213

(51) Int. Cl.
*A01F 15/08* (2006.01)
*A01F 15/04* (2006.01)

(52) U.S. Cl.
CPC ........ *A01F 15/0841* (2013.01); *A01F 15/042* (2013.01)

(58) Field of Classification Search
CPC .... A01F 15/0841; A01F 15/042; A01F 15/08; A01F 15/085; A01F 29/14
See application file for complete search history.

(56) References Cited

U.S. PATENT DOCUMENTS

2015/0208586 A1 7/2015 Lang et al.
2016/0050850 A1 2/2016 Bonte et al.
(Continued)

FOREIGN PATENT DOCUMENTS

WO WO-2016016095 A1 * 2/2016 ............. A01F 15/08

OTHER PUBLICATIONS

Notification of Transmittal of the International Search Report and the Written Opinion of the International Searching Authority, or the Declaration dated Dec. 17, 2019 for International Application No. PCT/EP2019/079697 (10 pages).
(Continued)

*Primary Examiner* — Abigail A Risic
(74) *Attorney, Agent, or Firm* — Peter K. Zacharias; Rebecca L. Henkel; Rickard K. DeMille

(57) ABSTRACT

A mounting for a baling machine gearbox includes a first, cylindrical support member secured to and extending from at least a first part of a rigid frame inside the baling machine and a second support member secured to and extending from at least a further part of the rigid frame that in use is spaced vertically from the first part of the rigid frame. The gearbox includes at least one selectively tightenable and loosenable clamp that encircles the first support member and the mounting includes at least one releasable connection securing the gearbox to the second support member, whereby on disconnecting of an input rotary shaft and a crank from the gearbox, and disconnecting of the releasable connection and loosening of the clamp the gearbox is rotatable from the operational position to an access position permitting access to the plunger while supported on the first support member.

20 Claims, 2 Drawing Sheets

(56) References Cited

U.S. PATENT DOCUMENTS

2018/0098504 A1     4/2018  Kraus
2018/0098507 A1*    4/2018  Kraus ..................... A01F 15/04
2021/0127581 A1*    5/2021  McClure ............... A01F 15/085

OTHER PUBLICATIONS

Extended European Search Report dated Apr. 15, 2019 for European Patent Application No. 18204213.5 (5 pages).

* cited by examiner

MOUNTING FOR A BALING MACHINE GEARBOX

CROSS REFERENCE TO RELATED APPLICATION

This application is a continuation of International Application No. PCT/EP2019/079697 filed Oct. 30, 2019, which claims priority to European Application No. 18204213.5 filed Nov. 2, 2018, the contents of which are incorporated herein by reference.

FIELD OF THE INVENTION

The present invention pertains to an agricultural baling machine and, more specifically, to a mounting for a baling machine gearbox.

BACKGROUND OF THE INVENTION

Baling machines are well known in agriculture and are widely used to bale plant matter in fields into bales that may be conveniently and effectively handled, stored and used. Baling machines are known that bale forage products such as grass and other leaves used as hay or other types of animal feed; straw or other plant parts resulting as by-products from a harvesting operation such as combine harvesting; cotton; and other plant parts of commercial or other value.

The majority of baling machines in use in Europe are designed to be towed behind an agricultural tractor or another towing vehicle that, under the control of an operator and/or using operator-monitored software, moves the baling machine about a field and provides power to operate internal parts of the baling machine. The provision of power is effected by way of a rotatable power take-off (PTO) shaft connected to the rotary power take-off that typically is part of the tractor.

Known designs of agricultural baling machine include a pick-up, mounted at the front of the machine, that causes the ingestion of plant matter into the interior of the machine as it moves about a field. Differing internal designs of baler components are known in the part of the machine downstream of the pick-up.

One commonplace type of baling machine is often referred to as a "rectangular baler". This includes a cuboidal bale-forming chamber in which the ingested plant matter is compacted into a cuboidal shape by a piston or plunger that reciprocates longitudinally back and forth inside the bale-forming chamber between retracted and extended positions. Charges of plant matter repeatedly are fed into the bale-forming chamber from the pick-up by the mechanism of the baling machine. This action is timed with the motion of the plunger such that feeding of plant matter coincides with retraction of the plunger to one end of the bale-forming chamber. The plant matter then is compacted by subsequent extension strokes of the plunger along the bale-forming chamber.

The reciprocal rectilinear motion of the plunger is effected using a driveline that converts rotary drive derived from the rotating PTO shaft, connected to the baling machine above the pick-up, into reciprocal motion of the plunger. This typically is achieved by changing, in the driveline, the axis of the rotation from the input shaft rotation parallel to the longitudinal length of the baling machine to output crank shaft rotation about an axis transverse thereto. A gearbox is provided inside the baling machine for this purpose. The invention gives rise to improvements in the mounting of such a gearbox.

The transverse-axis rotation is applied to a crank that is pivot-jointed to one end of a conrod the other end of which is pivot-jointed to the plunger, that is moveably captive inside the bale-forming chamber. As a result, rotation of the crank causes the reciprocal movement of the plunger.

The driveline between the power take-off of the tractor and the plunger includes a heavy flywheel (that in some baling machine designs weighs 600 kg or more) secured to a rotatable shaft that defines or is connected to an input shaft in turn connected in use to the gearbox that effects the conversion of the longitudinal-axis input shaft rotation to transverse-axis crank shaft rotation as described.

The baling machine includes a rigid machine frame that typically is made up of a number of rigid metal members that are securely joined together, e.g. by welding, to define the frame. The frame supports the majority of the parts of the baling machine, and in the prior art is known to have two or more transversely extending members secured thereto for supporting the gearbox.

The flywheel is needed because the plunger during its motion is associated with very high, and highly varying, levels of kinetic energy that might peak at 800 Hp (about 600 kW). In the absence of the flywheel it might be impossible for the rotary power take-off of a tractor to provide sufficient power to move the plunger, and very high forces might be transmitted back towards the tractor via the PTO shaft potentially causing damage to the baling machine or tractor or making the tractor-baling machine combination difficult to control.

The flywheel and the plunger present a system having a high level of inertia and, in some cases, mechanical resistance (especially when the driveline is at rest or is moving slowly). The inertia and mechanical resistance can be increased by factors such as:
- the at-rest plunger position causing an unfavorable conrod transmission angle with the consequence that plunger movement is difficult to initiate;
- plant matter in the bale-forming chamber resisting movement of the plunger; and/or
- larger, less compressible items, such as tree branches, litter and stones, impeding movement of the plunger in the bale-forming chamber.

It is clear therefore that the mounting for the baling machine gearbox must withstand and react potentially very high forces generated during movement of the plunger.

Furthermore, however it is a requirement for the gearbox to be demountable so that access to the rear of the plunger may be gained. This can be for example because of a maintenance requirement relating to the crank and conrod arrangement or because it is necessary to withdraw the plunger from the bale-forming chamber.

In prior art arrangements mounting of the gearbox is achieved by providing upper and lower, rigid, square cross-section tubes extending transversely from one side of the interior of the baling machine to the other, interconnecting two transversely opposite sides of the machine frame described above. An upper part of the gearbox, or a part connected to the gearbox, is secured to the upper tube and a lower part of the gearbox is secured to the lower tube. Such securing may be achieved using fasteners such as bolts.

This arrangement is strong, but despite this it is known for premature failures of the prior art mounting arrangement to arise. This is primarily because the square cross-section tubes require accurate positioning, and also accurate tolerancing of the parts of the gearbox that are secured to them; but these aspects are hard to achieve. As a result, the connections between the gearbox parts and the tubes may not be correctly aligned, giving rise to unintended force transmission paths that lead to premature wear and failure of the components defining the mounting; or the connections simply are not as strong as they are intended to be as a result of the tolerancing problems.

Also, when it is required to withdraw the plunger from the bale forming chamber it is necessary to remove at least the upper tube from the machine frame in order to permit removal of the gearbox and thereby provide access to the rear of the bale forming chamber.

It would be desirable to provide a mounting for a baling machine gearbox that obviates or at least ameliorates one or more drawbacks of the prior art.

The terms "baling machine" and "baler" are used synonymously herein and in the art generally.

The term "gearbox" embraces within its meaning any collection of drive-transferring components that result in some form of conversion of drive, such as but not limited to conversion from rotation about one axis to rotation about a different axis as described herein. It is not necessary for the parts of a gearbox as referred to herein to be all within a common housing; or to be inside any form of housing, it being necessary only that the parts of a gearbox may be supported collectively in the baling machine. In the majority of embodiments within this disclosure however references to gearboxes are to collections of drive-transferring components that are supported in a housing such as but not limited to a metal casting.

The term "power take-off" is synonymous with the acronym "PTO".

The term "tractor" embraces a wide variety of machines potentially capable of towing a baling machine, as will be known to the person of skill in the art.

The term "clutch" except as otherwise explained embraces any design of clutch that is suitable for transferring drive in the circumstances described.

The term "plant matter" and derivatives includes but is not limited to all types of matter that potentially may be ingested into a baling machine for the purpose of being formed into bales.

The terms "piston" and "plunger" in the context of the principal, moveable, bale-forming part of a bale-forming chamber are used synonymously herein.

SUMMARY OF THE INVENTION

According to embodiments disclosed herein there is provided a mounting for a baling machine gearbox having connected thereto an input rotary shaft and an output crank shaft, the input rotary shaft in an operational position of the gearbox being releasably connected to the gearbox and being rotatable about a first axis and the crank shaft being rotatable about a second axis that is non-parallel to the first axis and rotatably driving a crank that defines or forms part of a releasable pivot connection to a reciprocable baling machine plunger, the mounting including a rigid frame, a first, cylindrical support member secured to and extending from at least a first part of the rigid frame, a second support member secured to and extending from at least a further part of the rigid frame that in use is spaced vertically from the first part of the rigid frame and at least one selectively tightenable and loosenable gearbox clamp for securing a said gearbox and that clamps about the first support member, the mounting including at least one releasable connection securing the gearbox to the second support member, and the shape of the first support member being such that on disconnecting of the input shaft and the crank, disconnecting of the releasable connection and loosening of the clamp the gearbox is rotatable between the operational position and an access position permitting access to the plunger while supported on the first support member.

Such an arrangement firstly permits tolerancing inaccuracies in the positioning of the support members and/or parts of the gearbox intended for mating with the support members to be at least partly accommodated, by permitting movement of the gearbox (i.e., the described rotation between the operational and access positions) that can be used to adjust the gearbox position, during assembly of the baling machine, in a manner ensuring correct force transmission in use. This helps to prolong the life of the gearbox mounting.

Also, the ability to move the gearbox between operational and access positions while it remains supported on the first member means that it is possible to gain access to the plunger of a baling machine without having to remove any of the support members.

Furthermore, the ability to move the gearbox while it is supported on the first support member means that it is not necessary, e.g. during maintenance operations, for an individual to support the whole mass of the gearbox. As a result, the risks of injury and of damage to the gearbox are reduced.

In practical embodiments the first and second support members typically would lie within the baling machine, for example inside a housing made up of panels. However, it is within the scope of the disclosure hereof that part or even all of one or both the first and second support members may protrude outside the recognizable extent of the baling machine.

In embodiments described herein preferably the first support member is positioned vertically higher than the second support member. Further preferably when the gearbox is in the operational position the first support member intersects a line that is or approximates to a line of action of force transmitted via the crank shaft when resistance to motion of the baling machine plunger is maximal.

These features help to ensure that the major part of any force it is required to react is accommodated by the first support member especially at a time when the resistance to motion of the plunger is at its greatest (i.e. normally when the plunger is at the rearmost part of its travel). This in turn means that the parts of the second (i.e. lower) support and any links connecting it to the gearbox do not need to be as robust as those associated with the first support member. This reduces costs and weight.

Conveniently the first support member rigidly interconnects two laterally spaced upper parts of the rigid frame. This provides robustness.

Also, conveniently the first support member defines a hollow cylinder, that optionally is hollow. Such a member is relatively cheap to manufacture and can be made to tighter tolerances than the prior art square cross-section tubes. When as is preferred it is formed as a cylinder however it is not essential that the first support member is hollow.

In embodiments described herein optionally the gearbox includes two selectively tightenable and loosenable clamps that each clamps about the first support member at respective locations that are spaced longitudinally along the first support member. This arrangement means that the gearbox is supported on the first support member at laterally spaced locations in a manner resisting any tendency of the gearbox to twist on its mounting in use.

Preferably each tightenable and loosenable clamp includes a pair of part-rings that are securable one to the other to define an annular or part annular clamp. The part rings may define inner circumferences that are dimensioned to match the outer dimensions of the first support member with the result that rotation of the gearbox around the first support member is facilitated.

Thus the clamp, in embodiments of the invention, may be such as to encircle the first support member when it is tightened. However, in other embodiments it is not necessary for the clamp fully to encircle the first support member or to define a complete annulus In embodiments of the present invention each tightenable and loosenable clamp optionally includes at least one releasable fastener for securing the part-rings one to the other. In practice two fasteners per pair of part-rings are preferred in order to provide a robust yet adjustable arrangement that readily can take account of variations in the outer diameter of the first support member.

Further, it is preferable that at least one of the part-rings is secured to or integral with a housing of the gearbox. In particular such a part-ring may be cast as part of a gearbox housing.

In preferred embodiments the second support member additionally rigidly interconnects two laterally spaced lower parts of the rigid frame. This further strengthens the mounting. The design of the mounting however means that the primary purpose of the second support member can be simply to inhibit rotation of the gearbox about the first support member by fixing a lower part of the gearbox. As a result it is not necessary for the second support member to be as strong as the first support member.

To this end, optionally, the second support member is or includes a rigid plate, which does not need to be engineered as strongly as the first support member.

Preferably the mounting includes a two degree-of-freedom link that interconnects the gearbox and the second support member. Such a link advantageously permits the mounting to accommodate any inaccuracies of manufacture of the described parts, such that tolerancing requirements further are reduced.

The two degree-of-freedom link may include a first link member that is secured to a housing of the gearbox using a first joint that is pivotable about a first link axis, and is secured to the second support member using a second joint that is pivotable about a second link axis that is non-aligned with the first link axis.

In particular, in this regard the first and second axes are mutually orthogonal. Other forms of two degree-of-freedom links are however possible within the scope of the invention.

Preferably the first link member is, or includes, a fork having at least one bifurcated part defining a plurality of prongs.

BRIEF DESCRIPTION OF THE DRAWINGS

There now follows a description of preferred embodiments of the invention, by way of non-limiting example, with reference being made to the accompanying drawings in which.

DETAILED DESCRIPTION OF THE INVENTION

Figure 1:
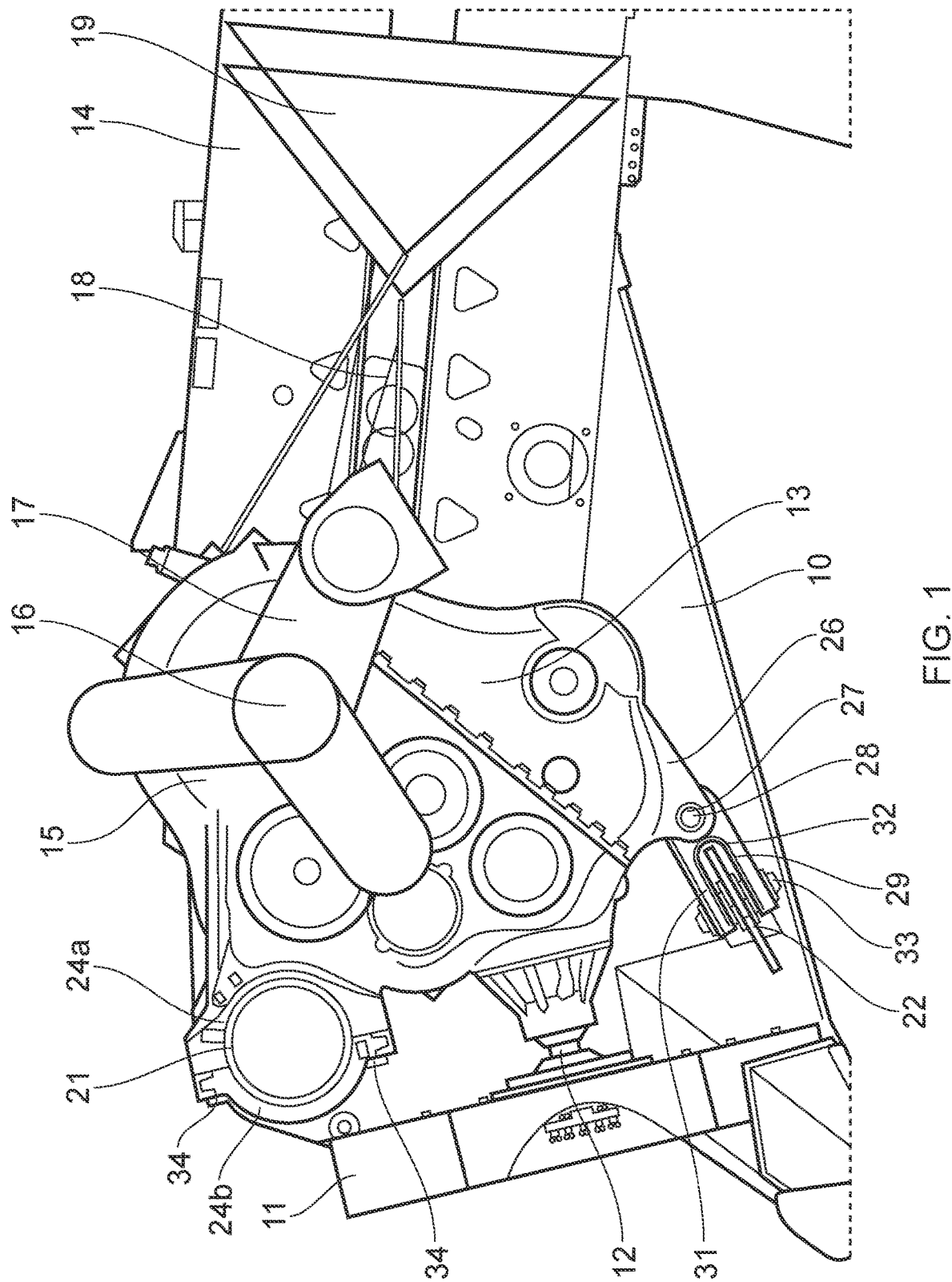
FIG. 1 is a side elevational, cross-sectional, partly schematic view of the interior of part of a baling machine illustrating one embodiment as defined herein.
Figure 2:
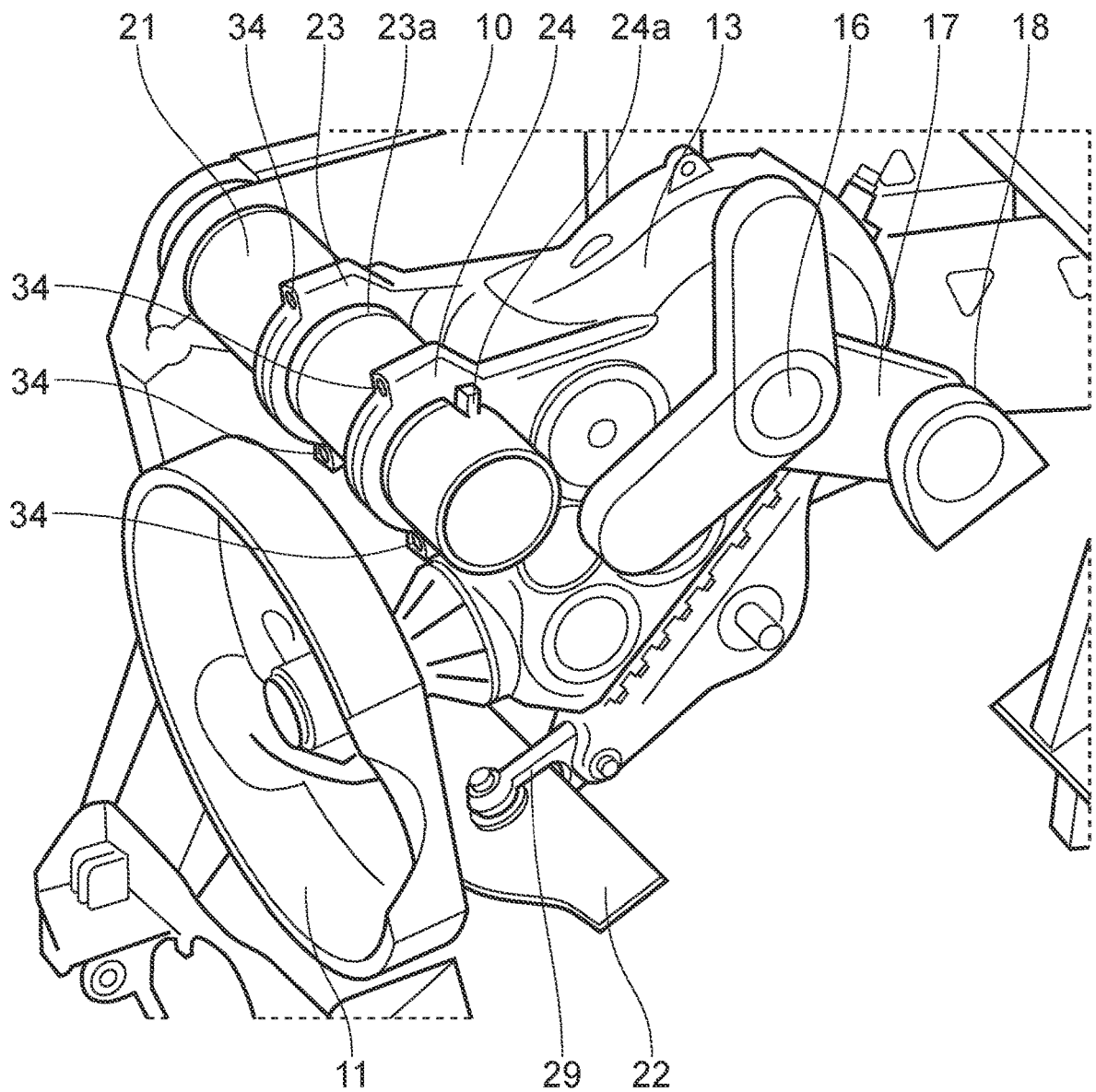
FIG. 2 is a perspective, partly cross-sectional view of the parts of FIG. 1.

Referring to the drawings, part of a baling machine is illustrated including a rigid, essentially planar side frame member 10 defining part of a machine frame of a kind that is known per se in the art of baling machine design. Typically in such a machine there would be provided two largely or completely identical such side frame members 10 extending along opposite sides of the interior of the baling machine, adjacent the outer sides thereof. Further frame members, that are not visible in the figures, would interconnect the side frame members in order to provide a rigid machine frame. Such features are well understood in the baling machine art and are omitted from the drawings in order to permit the illustration of further features as described herein.

The part of the baling machine that is visible in the figures includes a flywheel 11. Flywheel 11 is on one side mounted on a flywheel shaft that is omitted from the figures and on the other side on an input rotary shaft 12 that is connected as a rotary input to a gearbox 13.

The flywheel shaft is the output of a driveline intended to transfer rotary drive from a PTO of a tractor or other vehicle intended to tow the baling machine. The axis of rotation of the flywheel shaft coincides with the axis of rotation of the input rotary shaft 12, which extends inclinedly upwardly in the illustrated embodiment from the longitudinal front of the baling machine part illustrated, adjacent the flywheel 11, towards a bale-forming chamber 14. In functional terms the rotary input shaft may be regarded as an extension of the flywheel shaft in the illustrated embodiment, although this need not necessarily be the case.

The gearbox 13 includes a rigid, typically cast metal, housing 15 inside which are various drivingly interconnected parts that connect to an output crank shaft 16 the axis of rotation of which is skewed relative to that of input rotary shaft 12, and in the illustrated embodiment extends at 90° thereto. The internal parts of the gearbox 13 may take a variety of forms and their precise design is not important to understanding of the invention. For this reason the interior mechanism of the gearbox 13 is not described herein.

Gearbox types in which a drive conversion other than that described, for example resulting in an output shaft rotation other than at 90° to rotation of an input shaft, are within the scope of the disclosure hereof.

The gearbox 13 is shown in its normal, operational position in which the input rotary shaft 12 is connected to the gearbox 13 in a manner transferring rotary drive thereto in a per se known manner. The connection between the rotary input shaft 12 and the gearbox 13 is releasable for a purpose as described below. Such releasability may be achieved through the use of bolts, screws or functionally similar fastenings.

The crank shaft 16 is connected rotatably to drive a crank 17. This is releasably pivotably connected to one end of a conrod 18 that is illustrated schematically in the figures. The other end of conrod 18 is pivotally connected to one side of a bale forming plunger 19 that also is schematically shown in FIG. 1.

Plunger 19 is constrained to reciprocate longitudinally along cuboidal bale-forming chamber 14, also in a per se known manner that is not described herein in detail. Rotation of the crank shaft 16 causes such reciprocal motion of the plunger 19.

The mounting for the gearbox 13 includes a first, upper, hollow cylindrical support member in the form of support tube 21. As illustrated this is rigidly secured to, and extends at right angles to, frame member 10 towards the opposite frame member that as noted is omitted from the drawings. The support tube 21 is secured to the opposite frame member in a similar or identical manner to its securing to frame member 10. Welds typically would be employed for this purpose although other securing methods may be employed.

Support tube 21 is located at a relatively high location in the parts defining the gearbox mounting. A second support member in the form of a support plate 22 extends somewhat similarly to support tube 21 at a lower level in the baling machine. Thus support plate 22 extends from a different part of the frame member 10 than support tube 21 that is spaced vertically below the location of the support tube 21. Support plate 22 is inclined as illustrated and is shaped to provide maximal strength in regions required to react forces through connection to a link described below. Such shaping however, and the orientation of the support plate 22, may be varied widely to suit precise needs.

At external locations near its upper side the gearbox 13 is formed with a pair of selectively tightenable and loosenable clamps 23, 24 that are described below.

The clamps 23, 24 encircle the support tube 21. When they are tightened they clamp the gearbox 13 to the support tube 21 and when loosened they permit rotation of the gearbox about the support tube 21, if the other restraints of the gearbox 13 described herein also are disconnected.

At its lower end the housing 15 includes protruding therefrom a lug 26 that is formed to define a through-going eye 27. A bolt, pin or similar component 28 having a longitudinal axis that is parallel with the axis of crank shaft 16 passes through the eye 27 and secures a link in the form of a rigid metal fork 29 having a through-going aperture formed in its non-bifurcated part. The bolt 28 extends through the aperture in the non-bifurcated part of the fork 29. Spacers are included to prevent tight contact between the bolt 28 and the fork 29 with the result that the fork is rotatable about the axis of the bolt 28, the extent of rotation being limited by neighboring components of the baling machine.

At its end opposite that receiving bolt 28 fork 29 bifurcates into two prongs 31, 32. These extend to either side of the edge of support plate 22 nearest to gearbox 13. The ends of the forks 31, 32 are perforated by through-going bores that align with a further through-going bore formed in the support plate 22. A further bolt, pin or similar component 33 passes through the aligned bores. Further spacers permit rotation of the fork prongs 31, 32 about an axis that is perpendicular to the axis of bolt 28.

The bolts, pins or similar components 28, 33 are fastened using fasteners at least one of which is releasable in order to permit dismantling of the resulting connection. As a result there is defined a releasable connection securing the gearbox to the second support member that as noted is formed as a support plate 22 in the illustrated embodiment.

The result of the foregoing arrangement is that the gearbox in use is secured at two locations, represented respectively by its connections to the support tube 21 and the support plate 22, to the mounting; and it furthermore includes two releasable shaft connections as described. It will thus be apparent that by releasing the connection securing the gearbox to the support plate 22, releasing the connections of the shafts 12, 16 and slackening or loosening the clamps 23, 24 the gearbox 13 becomes rotatable about the support shaft 21. This permits the gearbox 13 to be swung upwardly away from the vicinity of the end of the bale-forming chamber 14 thereby permitting access to the plunger 19. The gearbox 13 remains pivotingly supported on the support tube 21 during this process. As explained, this provides numerous advantages in terms of maintenance of the baling machine.

The gearbox 13 is designed so that the rotation axis of the crankshaft 16 is no lower in an in-use vertical direction than the center line of the motion of the plunger 19 in the bale-forming chamber 14. The support tube 21 is located at a vertical height in the baling machine that is at least approximately in line with the axis of the crank shaft 16. As a result, the longitudinal axis of the support tube 21 intersects a line that is or approximates to a line of action of force transmitted via the crank shaft when resistance to motion of the baling machine plunger 19 is maximal. This condition usually arises when the plunger 19 is at the rearmost extent of its reciprocation in the bale-forming chamber 14.

The result of this arrangement is that the support tube 21 reacts to the major part of any force exerted through the gearbox 13 from the plunger 19. In turn this means that the connection to the support plate 22 can be engineered less robustly than the support tube 21 and the parts connected to it, because the primary role of the connection to the support plate 22 is to inhibit rotation of the gearbox 13 when in its operational position. The connection to the support plate 22 is not required to react the primary forces experienced by the gearbox 13, which forces as explained follow force transmission paths predominantly in the upper part of the gearbox 13.

The two tightenable and loosenable clamps 23, 24 are spaced from one another along the support tube 21. As a result they inhibit any tendency of the gearbox 13 in use to twist on its mounting relative to the support tube 21.

Each of the clamps 23, 24 includes a pair of part-rings that are mateable with one another to define an annular clamp. In the embodiment illustrated in the drawings in each case a first part ring 23a, 24a defining a first semi-circular inner half-circumference is formed as a casting as part of the housing 15 of the gearbox 13. A second part ring 23b, 24b defines a respective second semi-circular inner half-circumference that when mated with the first half-circumference in the case of each clamp 23, 24 defines a circular clamping surface.

Respective upper and lower, adjustably tightenable fasteners such as screws 34 extend through bores formed in the part-rings to permit tightening of the part-rings in mating engagement. This in turn permits tightening of the clamps 23, 24. Screw threads or nuts may be provided for this purpose, as will occur to the person of skill in the art. When these are tightened the clamps 23, 24 become non-rotatably secured on the support tube 21.

The part-rings 23a, 24a are in the described embodiment integrally cast with the remainder of the housing 15 but in other embodiments could be secured to the housing in other ways as also will occur to the person of skill in the art.

The connection of the gearbox 13 to the support plate 22 defines a two degree-of-freedom link including a first link member in the form of the fork 29. This is connected to the housing 15 of the gearbox 13 by way of the first joint defined by bolt, pin or similar connector 28. The link member (fork 29) is connected to the support plate by way of a second joint represented by bolt, pin or similar component 33.

The use of the two degree-of freedom link in conjunction with the adjustability represented by the clamps 23, 24, that can be tightened to the degree needed to accommodate manufacturing variations in e.g. the support tube 21 and the rigid frame members 10, means that on assembly the described mounting readily can cater for manufacturing tolerances and other deviations from nominal dimensions.

The ability as described, on releasing of the described releasable connections and loosening of the clamps 23, 24, to swing or pivot the gearbox out of the vicinity of the plunger 19 while the mass of the gearbox 13 remains supported on the support tube 21 represents a significant advantage compared with prior art gearbox mounting arrangements.

The clamps 23, 24 can be arranged to be fully dismantleable so that the gearbox can be entirely removed from the baling machine as desired. In the illustrated embodiment this is achieved by completely unscrewing the screws 34 and separating the part-rings 23b, 24b from the part rings 23a, 24a. Other ways of achieving this function also are viable.

Numerous variants on the described embodiment are possible. One example is illustrated in FIG. 1, in which a pair of lugs 26 are provided extending parallel to one another a short distance apart. The through-going eye 27 may be provided in each of these lugs and the bolt, pin or similar component 28 be provided in sufficient length to connect them with the fork 29 interposed between the two lugs 26. This is a more stable arrangement than one involving a single lug 26.

It is not necessary to provide two clamps 23, 24 that are paced along the support tube 21 but as noted this arrangement also offers advantages in terms of stability.

Overall the invention provides a significant advance over the prior art arrangements.

The listing or discussion of an apparently prior-published document in this specification should not necessarily be taken as an acknowledgement that the document is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A mounting for a baling machine gearbox having connected thereto an input rotary shaft and an output crank shaft, the input rotary shaft in an operational position of the gearbox being releasably connected to the gearbox and being rotatable about a first axis and the output crank shaft being rotatable about a second axis that is non-parallel to the first axis and rotatably driving a crank that defines or forms part of a releasable pivot connection to a reciprocable baling machine plunger, the mounting comprising:
    a rigid frame;
    a first, cylindrical support member secured to and extending from at least a first part of the rigid frame;
    a second support member secured to and extending from at least a further part of the rigid frame that in use is spaced vertically from the first part of the rigid frame; and
    at least one selectively tightenable and loosenable gearbox clamp for securing the gearbox and that clamps about the first support member, the mounting including at least one releasable connection securing the gearbox to the second support member, and the first support member having a shape such that upon disconnecting of the input rotary shaft and the crank, and the disconnecting of the releasable connection and loosening of the gearbox clamp the gearbox is rotatable from the operational position to an access position permitting access to the plunger while the gearbox is supported on the first support member.

2. The mounting of claim 1, wherein the first support member is positioned vertically higher than the second support member.

3. The mounting of claim 1, wherein when the gearbox is in the operational position the first support member intersects a line that is or approximates to a line of action of force transmitted from the output crank shaft when resistance to motion of the baling machine plunger is maximal.

4. The mounting of claim 1, wherein the first support member rigidly interconnects two laterally spaced upper parts of the rigid frame.

5. The mounting of claim 1, wherein the first support member defines a hollow cylinder.

6. The mounting of claim 1, wherein the gearbox includes two selectively tightenable and loosenable clamps that each clamp about the first support member at respective locations that are spaced longitudinally along the first support member.

7. The mounting of claim 6, wherein each tightenable and loosenable clamp includes a pair of part-rings that are securable one to the other to define an annular or part-annular clamp.

8. The mounting of claim 7, wherein each tightenable and loosenable clamp further includes at least one adjustably tightenable fastener for securing the part-rings one to the other.

9. The mounting of claim 7 wherein at least one the part-rings is secured to or integral with a housing of the gearbox.

10. The mounting of claim 1, wherein the second support member rigidly interconnects two laterally spaced lower parts of the rigid frame.

11. The mounting of claim 1, wherein the second support member is or includes a rigid plate.

12. The mounting of claim 1, further comprising a two degree-of-freedom link that interconnects the gearbox and the second support member.

13. The mounting of claim 12, wherein the two degree-of-freedom link includes a first link member that is secured to a housing of the gearbox using a first joint that is pivotable about a first link axis and is secured to the second support member using a second joint that is pivotable about a second link axis that is non-aligned with the first link axis.

14. The mounting of claim 13, wherein the first link member is or includes a fork having at least one bifurcated part defining a plurality of prongs.

15. A mounting coupled to a baling machine gearbox, the baling machine gearbox having an input rotary shaft and an output crank shaft connected thereto, the input rotary shaft in an operational position of the gearbox being releasably connected to the gearbox and being rotatable about a first axis and the output crank shaft being rotatable about a second axis that is non-parallel to the first axis and rotatably driving a crank that defines or forms part of a releasable pivot connection to a reciprocable baling machine plunger, the mounting comprising:
- a rigid frame;
- a first, cylindrical support member secured to and extending from at least a first part of the rigid frame;
- a second support member secured to and extending from at least a further part of the rigid frame that in use is spaced vertically from the first part of the rigid frame; and
- at least one selectively tightenable and loosenable gearbox clamp for securing the gearbox to the first support member, the mounting including at least one releasable connection securing the gearbox to the second support member, and the first support member being shaped such that upon disconnecting the input rotary shaft, the crank, and the releasable connection and loosening of the gearbox clamp then the gearbox is rotatable from the operational position to an access position, thereby permitting access to the plunger while the gearbox is supported on the first support member.

16. The mounting of claim 15, wherein the first support member is positioned vertically higher than the second support member.

17. The mounting of claim 16, wherein when the gearbox is in the operational position the first support member intersects a line that is or approximates to a line of action of force transmitted from the output crank shaft when resistance to motion of the baling machine plunger is maximal.

18. The mounting of claim 17, wherein the first support member rigidly interconnects two laterally spaced upper parts of the rigid frame.

19. The mounting of claim 18, wherein the first support member defines a hollow cylinder.

20. The mounting of claim 19, wherein the at least one selectively tightenable and loosenable clamp is two selectively tightenable and loosenable clamps that each clamp about the first support member at respective locations that are spaced longitudinally along the first support member.

* * * * *